United States Patent [19]
Bollen et al.

[11] 3,975,485
[45] Aug. 17, 1976

[54] PRODUCTION OF FILMS AND SHEETS OF POLYESTER-POLYCARBONATE BLENDS

[75] Inventors: Phillip Stuart Bollen, Auburn; Surendra A. Amin, Pottsville, both of Pa.; William Sacks, Gillette, N.J.

[73] Assignee: Allied Chemical Corporation, Morris Township, N.J.

[22] Filed: Jan. 7, 1976

[21] Appl. No.: 647,255

Related U.S. Application Data

[62] Division of Ser. No. 489,017, July 16, 1974.

[52] U.S. Cl. ................................. 264/171; 264/92; 264/176 R; 264/216
[51] Int. Cl.² .................... B29C 17/04; B29F 3/012
[58] Field of Search .............. 264/171, 176, 216, 92

[56] References Cited
UNITED STATES PATENTS

| | | | |
|---|---|---|---|
| 2,743,250 | 4/1956 | Sweet et al. | 264/216 X |
| 3,155,756 | 11/1964 | Hechelhammer et al. | 264/176 R X |
| 3,423,493 | 1/1969 | Klenk et al. | 264/176 R X |
| 3,775,521 | 11/1973 | Yamamota et al. | 264/171 X |
| 3,790,327 | 2/1974 | Haberle | 264/176 R X |
| 3,836,620 | 9/1974 | Bhuta et al. | 264/216 X |
| 3,840,497 | 10/1974 | Gondorchin et al. | 264/176 R X |

*Primary Examiner*—Lewis T. Jacobs
*Assistant Examiner*—S. M. Person
*Attorney, Agent, or Firm*—Roger H. Criss; Patrick L. Henry

[57] ABSTRACT

This invention provides a film or sheet capable of being thermoformed into a shaped article and being formed from a blend of about 60 to 85 parts by weight of a polyethylene terephthalate polymer having an intrinsic viscosity of at least about 0.90 and correspondingly about 40 to 15 parts by weight of a polycarbonate polymer, the polyethylene terephthalate portion of the film or sheet having a degree of crystallinity in the range of about 20 to 40%. The film is essentially non-oriented. The present invention also provides shaped articles thermoformed from such film or sheet, such as cook-in-trays. Moreover, this invention provides a process of forming such film or sheet which comprises the steps of blending about 60 to 85 parts by weight of a polyethylene terephthalate polymer having an intrinsic viscosity of at least about 0.90 with correspondingly about 40 to 15 parts by weight of a polycarbonate resin, extruding the resultant blend at a temperature of above about 500°F onto a moving support such as a casting roll while maintaining the surface of the support at a temperature of about 225° to 380°F whereby a film or sheet of the blend is formed, and collecting the thus formed film or sheet.

8 Claims, No Drawings

PRODUCTION OF FILMS AND SHEETS OF POLYESTER-POLYCARBONATE BLENDS

This is a division of application Ser. No. 489,017, filed July 16, 1974.

BACKGROUND OF THE INVENTION

1. Field of the Invention

This invention relates to films and sheets formed of blends of polyethylene terephthalate and polycarbonate resins useful as cook-in-trays.

2. Discussion of the Prior Art

Frozen foods, which can be cooked in the tray in which they are packaged, are a standard commercial item. These so-called "convenience" foods are usually packaged in a tray or similar structure formed of aluminum and are intended for home as well as industrial uses. Such trays, however, are somewhat aesthetically unpleasing. Additionally, the price of aluminum has been increasing to very high levels. Consequently, efforts have been expended to find a substitute for aluminum as the material used in forming cook-in-trays and the like. Recently there has been marketed polysulfone trays which are generally thermoformed from a sheet of polysulfone resin. Although material costs and resultant physical properties compare favorably with aluminum trays, relatively long cycle times are required to produce such trays on conventional thermoforming machines.

It is known that various thermoplastic resins can be blended to generally take advantage of the separate properties of each resin. For example, U.S. Pat. No. 3,218,372 issued in 1965 to Okamura et al discloses a molding material formed from a blend of a polyalkylene terephthalate (e.g. polyethylene terephthalate) having an intrinsic viscosity of 0.5 – 0.85 and a polycarbonate having an intrinsic viscosity of 0.46 – 1.2. Blend ratios disclosed in said patent range, in parts by weight, from 95 – 5 polycarbonate and from 5 – 95 polyalkylene terephthalate. It is therein disclosed that compositions containing 95 – 70 polycarbonate and 5 – 30 polyalkylene terephthalate possess low melt viscosities compared with polycarbonate alone so as to facilitate molding operations, whereas compositions containing 5 – 70 parts polycarbonate and 95 – 30 parts polyalkylene terephthalate have enhanced hardness and tensile strength over polyalkylene terephthalate alone.

SUMMARY OF THE INVENTION

This invention provides a film or sheet capable of being thermoformed into a shaped article and being formed from a blend of about 60 to 85 parts by weight of a polyethylene terephthalate polymer having an intrinsic viscosity of at least about 0.90 and correspondingly about 40 to 15 parts by weight of a polycarbonate polymer, the polyethylene terephthalate portion of the film or sheet having a degree of crystallinity in the range of about 20 to 40%. The film is essentially non-oriented. The present invention also provides shaped articles thermoformed from such film or sheet, such as cook-in-trays. Moreover, this invention provides a process of forming such film or sheet which comprises the steps of blending about 60 to 85 parts by weight of a polyethylene terephthalate polymer having an intrinsic viscosity of at least about 0.90 with correspondingly about 40 to 15 parts by weight of a polycarbonate resin, extruding the resultant blend at a temperature of above about 500°F onto a moving support such as a casting roll while maintaining the surface of the support at a temperature of about 225° to 380°F whereby a film or sheet of the blend is formed, and collecting the thus formed film or sheet.

The film or sheet may be molded by conventional molding techniques, such as thermoforming, into shaped articles such as cook-in-trays which possess a high degree of toughness and impact resistance and are resistant to distortion at elevated temperatures.

DESCRIPTION OF THE PREFERRED EMBODIMENT

As mentioned above, the film or sheet of this invention is formed from a particular blend of a polyethylene terephthalate polymer and a polycarbonate polymer. The terms "film" and "sheet" are intended to mean thin cast, extruded or otherwise formed products. In general, the term film denotes thin structures having a thickness of up to about 10 mils whereas the term sheet denotes thin structures having a thickness of 10 mils or above. The film or sheet of this invention have a thickness in the range of 1 to 50 mils, preferably 5 – 25 mils and more preferably 10 – 20 mils.

The polyethylene terephthalate polymer (hereinafter PET) employed herein is a polymer having an intrinsic viscosity of at least about 0.90, the intrinsic viscosity being measured in a mixed solvent of 60 parts by weight phenol and 40 parts by weight tetrachloroethane. Preferably, the intrinsic viscosity is in the range of about 0.9 to 1.2, more preferably about 0.9 to 1.0. Such PET polymers melt in their crystallized state at about 490° to 525°F. The polycarbonate polymer employed herein may be any polycarbonate such as the reaction product of phosgene or a carbonic acid diester with bisphenol A, i.e., poly(4,4'-isopropylidene diphenylene carbonate). The polycarbonate may have an intrinsic viscosity in the range of about 0.45 to 1.2 as measured in methylene chloride solvent. Such polycarbonate polymers are essentially non-crystalline and soften at about 275°–350°F. The intrinsic viscosities referred to herein are the viscosities measured before blending the two polymers.

The PET and polycarbonate polymers are blended to provide a preferably uniform blend of about 60 to 85 parts by weight PET and correspondingly 40 to 15 parts by weight polycarbonate. Preferred compositions comprise 65 to 80 parts by weight PET and correspondingly about 35 to 20 parts by weight polycarbonate. Blends containing less than about 15 parts by weight polycarbonate result in films and sheets which have inadequate impact and fracture resistance. Blends containing less than about 60 parts by weight PET have relatively poor heat resistance and poor thermoformability as well as presenting problems in obtaining uniform optical properties.

The two polymers may be blended together using any conventional blending apparatus. They may be blended in the solid or melted state; preferably the PET and polycarbonate are dry blended in pellet form at about room temperature. The duration of the mixing is primarily dependent upon the desired degree of blend uniformity. Blending may be performed prior to or in the extruder.

Conventional additives may be added during the mixing operation. Such additives include stabilizers, pigments such as titanium dioxide and carbon black, and fillers such as silicas, silicates, glasses, carbonates, alumina, etc, and reinforcing agents such as glass fibers and the like.

Since both PET and polycarbonate polymers are hygroscopic, preferably the blended mixture is dried at elevated temperatures (e.g., above 212°F) for a sufficient period of time. For example, the blend may be dried at 212°F for 12 to 18 hours in a circulating hot air oven.

The blend is formed into a film or sheet by extrusion of a molten mixture. Preferably, the blend is charged to a screw extruder wherein the blend is melted and additional mixing occurs and the film or sheet exits through a flat die head. Conventional film or sheet extruders may be utilized for this purpose. Preferred extrusion temperatures are above about 500°F, preferably 510° to 600°F. The extrudate exiting the die head is passed onto a moving support such as a rotating casting or cooling roll which serves to cool the molten layer into a coherent film or sheet. Conventional casting rolls may be employed for this purpose, such as chromium plated rolls. As is well understood by those skilled in the art, the rate of extrusion, the width of the extruder die orifice and the speed of the moving support may be varied widely and determine the thickness of the film.

The surface temperature of the rotating support is maintained in the range of about 225° to 380°F, preferably 250° to 350°F by providing the support with heating means. This can readily be accomplished, for example, by providing a heat transfer fluid within the interior of the casting roll or the like in a conventional manner.

Following extrusion onto the moving support, the film or sheet may be further cooled down prior to collecting the same by passing the film or sheet over one or more additional moving supports, such as additional rolls, in a manner generally employed for extrusion of films and sheets. Such additional rolls may be heated or unheated. However, any such additional moving supports move or rotate at substantially the same linear speed as the first moving support so that the film or sheet is not subjected to a drawing or stretching operation which would orient the same. The film or sheet is collected using conventional apparatus, such as a winding roll or the like.

The film or sheet of this invention is essentially non-oriented, that is, shrinks less than 5% in the machine and transverse directions after 10 minutes at temperatures above about 400°F, and is partially crystallized. As discussed above, the PET portion of the film or sheet is partially crystallized, with a crystallinity in the range of about 20 to 40%. The crystallinity referred to is that obtained by the well-known density method as described in "Engineering Design for Plastics", E. Baer, Reinhold Publishing Co., 1964, pp. 98 – 99. This partial crystallinity results from utilizing the above disclosed range of surface temperatures on the support onto which the film or sheet is extruded (e.g., casting roll). For example, crystallinities in the range of 35 – 40% can be obtained using a casting roll temperature of about 350°F, 25 – 30% at 300°F and 20 – 25% at 250°F.

It has been determined that when the crystallinity of a PET-polycarbonate blended film or sheet is below about 20%, the thermal resistance thereof is unacceptable. That is, articles molded from such film or sheet, such as cook-in-trays distort when subjected to elevated temperatures. For instance, cook-in-trays thermoformed from the blended film or sheet have low heat resistance when exposed to temperatures above 300°F, e.g., cooking temperatures. Such trays become distorted and shrink in the oven, with a minimum result of an unaesthetically appealing product and the possibility of spill-over of the contained food during cooking. When the crystallinity level is above about 40%, articles formed from the film or sheet have low impact and fracture resistance. This is especially a problem with cook-in-trays which are designed to be frozen with the contained food; inadvertent dropping of such trays may result in their fracture if the crystallinity level is above about 40%.

It has been additionally found that films and sheets produced from a PET polymer having an intrinsic viscosity of at least about 0.90 have increased toughness as compared to films and sheets produced from a PET polymer having an intrinsic viscosity below about 0.90. Additionally, the higher intrinsic viscosity provides improved processibility of the film and sheets in terms of easier extrusion and better control of thickness.

Since the film or sheet of the invention is essentially non-oriented, it may be drawn, molded or shaped to a high degree with short cycle times despite the product being partially crystallized. Such shaped articles as trays, cups, bowls, and the like can be readily formed from such film or sheet using conventional shaping equipment. For example, film or sheet in roll form may be rapidly thermoformed on conventional thermoforming machines into cook-in-trays and the like. A typical commercial thermoforming machine softens the film or sheet and forces it by pressure into the desired shape. Typical thermoforming temperatures useful in forming shaped articles from the film or sheet of this invention may range from about 250° to 500°F, with a thermoforming cycle of about 1 to 10 seconds followed by a cooling cycle of about 1 to 10 seconds. The resultant shaped articles exhibit a high toughness and high heat resistance. Cook-in containers so produced are essentially distortion-free at temperatures above about 300°F to as high as 400°F or greater.

Although it is known that biaxially oriented films of PET may be crystallized to form tough, heat resistant films, such films are difficult to draw or form into articles such as containers since the process of orientation largely removes the possibility of significantly further stretching of the molecular structure such as is required in drawing, forming and shaping operations. Although it has been suggested in U.S. Pat. No. 3,720,732 issued in 1973 to Sevenich that the properties of such biaxially oriented PET films can be improved by the addition of up to about 15% by weight polycarbonate resin, the shaping of such films is still difficult. Further, although non-oriented amorphous PET film or sheet can be produced, products formed therefrom become excessively brittle when heated above the softening temperatures which is about 155° – 160°F. In distinction thereto, the present invention provides a non-oriented blended film or sheet of PET and polycarbonate polymers comprising at least about 15 parts by weight polycarbonate which is easily thermoformable into shaped articles that possess high toughness, impact resistance and heat resistance.

The following non-limiting examples are given to further illustrate the present invention.

EXAMPLE 1

Various blends were prepared of PET resin having an intrinsic viscosity of 0.95 (measured in a 60:40 solution of phenol and tetrachloroethane at 25°C) and polycarbonate (PC) resin having an intrinsic viscosity of 0.56

(measured in dioxane at 30°C) as shown in Table 1. The blends also contained about 3% by weight titanium dioxide pigment. The blends were prepared by tumbling dry pellets of the resin and pigment in a 250 lb capacity drum for 15 minutes at 25 rpm. The blend was extruded using a 2½ inch diameter extruder and mixing type screw through a 30 inch wide die onto a steel casting roll heated to a desired temperature. The resulting sheet was 17 mils thick. Typical extrusion conditions were: extruder temperature, feed zone to front zone, 490° to 510°F; die connector temperature 525°F, die temperature 515°F, screw spread 60 – 75 rpm.

The casting roll temperature for each blend was varied between about 225°F to 380°F. The level of cooling imparted by the casting roll was found to be critical in determining the crystallinity of the PET fraction in the extruded film. Thus a temperature of 200°F gave an essentially non-crystalline film whereas the temperature range 250°F to 350°F gave best results for the dimensional stability of formed containers from the sheet. Under these conditions partially crystallized film were obtained e.g., with a blend of type 1 in Table I, cooled with the casting roll at 350°F, the PET fraction was about 33% crystallized in the sheet. Above 350°F the dimensional stability was very high but some decrease in toughness occurred.

Trays were prepared from the blended sheets formed on the casting roll at 350°F using a commercial thermoforming machine. The thermoforming cycle was 4 seconds heating time at 400°F and 3 seconds cooling time. The trays measured 5¼ × 4 × 1 inch deep and had a ¼ inch rim around the top.

EXAMPLE 2

The trays formed in Example 1 were tested for resistance to distortion and shrinkage in an oven as follows. Three fish sticks measuring 3¾ by ¾ inch diameter were placed in each tray. The trays were heated in a 350°F oven for one-half hour and allowed to cool to 75° – 80°F. The volume of the tray before the oven test was determined by measuring the volume of water required to fill the tray just to its rim. Similarly the volume of trays after heating at 350°F was determined and the change in volume calculated. Additional tests were made on trays from the six blends heated to 400°F for one-half hour. The results are shown in Table 1.

Table 1

| Blend No. | PET:PC Weight Ratio | Reduction in Volume at Oven Temp. % 350°F | 400°F |
|---|---|---|---|
| 1 | 80:17 | 13.7 | 15.0 |
| 2 | 75:22 | 12.4 | 13.7 |
| 3 | 70:27 | 12.4 | 17.4 |
| 4 | 65:32 | 20.0 | 26.2 |
| 5 | 60:37 | 21.0 | 27.5 |
| 6 | 58:38 | — | 29.5 |

Over the range PET:PC of 80:17 to 58:38 the volume decreases on heating ranged from about 13 to a high of 30%, the latter volume reduction considered to be borderline for use as a cook-in-tray.

EXAMPLE 3

Sheet was extruded from non-pigmented samples of PET:PC of the weight ratios shown in Table 2. Low temperature impact strength of the sheet was measured at −10°F using the Dart Drop Method of ASTM D-1709. Drop weights for 50% failure of the sample were determined. The samples were extruded using conditions similar to those for Example 1 using a casting roll temperature of 350°F which produced crystallinity levels in the PET fraction of the sheet of about 35 to 40%.

Table 2

| Weight Ratio PET:PC | F50 Failure Level (Grams) |
|---|---|
| 90:10 | 490 |
| 80:20 | 565 |
| 70:30 | 765 |
| 60:40 | 1100 |
| 50:50 | >1750 |

The results in Table 2 indicate acceptable impact resistance for all of the samples except the 90:10 sample.

EXAMPLE 4

Film of 7 mil thickness was extruded from two PET resins, resin A of intrinsic viscosity 0.85 and resin B of intrinsic viscosity, 0.95. The resins were melted and extruded on a one inch diameter extruder through a flat die maintained at 510°F. The molten film issuing from the die was cooled on a rotating steel roll maintained at 200°F. The results in Table 3 show the improved tensile strength, yield strength and increased ultimate elongation obtained with resin B.

Table 3

| | Resin A | Resin B |
|---|---|---|
| I.V. | 0.85 | 0.95 |
| Tensile Strength (lbs./in.[2]) | | |
| M.D.[1] | | |
| T.D. | 6500 | 11,000 |
| | * | 7,900 |
| Yield Strength (lbs./in.[2]) | | |
| M.D. | 5000 | 8,300 |
| T.D. | * | 6,900 |
| Ultimate Elongation (%) | | |
| M.D. | 300 | 400 |
| T.D. | less than 10 | 100 |

[1]M.D. = Machine Direction
T.D. = Transverse Direction
*sample snaps as stretching begins The above results demonstrate that films produced from a PET resin having an i.v. of 0.95 has a greater toughness than films produced from a resin having an i.v. of 0.85.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

We claim:

1. A process of forming a film or sheet capable of being thermoformed into a shaped article, said process comprising the steps of:
   a. blending about 60 to 85 parts by weight of a polyethylene terephthalate having an intrinsic viscosity of at least about 0.90 with correspondingly about 40 to 15 parts by weight of a polycarbonate,
   b. extruding the resultant blend at a temperature above about 500°F onto a moving support while maintaining the surface of said support at a temperature of about 225° to 380°F whereby a film or sheet of the blend is formed and
c. collecting said film or sheet.

2. The process of claim 1 wherein said moving support comprises a casting roll.

3. The process of claim 1 wherein said surface is maintained at a temperature of about 250° to 350°F.

4. The process of claim 1 wherein said blending comprises dry blending pellets of said polyethylene terephthalate with pellets of said polycarbonate.

5. The process of claim 1 including the step of drying said blend prior to extrusion.

6. The process of claim 1 wherein said film or sheet is not subjected to any substantial stretching forces after formation thereof and prior to said collecting, whereby a non-oriented film or sheet is produced.

7. The process of claim 1 wherein about 65 to 80 parts by weight of said polyethylene terephthalate are blended with about 35 to 20 parts by weight of said polycarbonate.

8. The process of claim 1 wherein additives selected from the group consisting of stabilizers, pigments, fillers and reinforcing agents are blended with said polymers.

* * * * *